(12) United States Patent
Harris

(10) Patent No.: US 6,842,461 B2
(45) Date of Patent: Jan. 11, 2005

(54) METHOD AND APPARATUS FOR DATA RETRANSMISSION WITHIN A COMMUNICATION SYSTEM

(75) Inventor: John M. Harris, Chicago, IL (US)

(73) Assignee: Motorola, Inc., Schaumburg, IL (US)

(*) Notice: Subject to any disclaimer, the term of this patent is extended or adjusted under 35 U.S.C. 154(b) by 156 days.

(21) Appl. No.: 10/093,563

(22) Filed: Mar. 8, 2002

(65) Prior Publication Data

US 2003/0169708 A1 Sep. 11, 2003

(51) Int. Cl.[7] .................................................. H04J 3/16
(52) U.S. Cl. ...................................... 370/465; 370/474
(58) Field of Search ................................. 370/230, 235, 370/278, 282, 320, 335, 342, 441, 394, 465, 473, 477; 455/13.4, 522; 714/748, 749, 750

(56) References Cited

U.S. PATENT DOCUMENTS

| 5,881,368 A | | 3/1999 | Grob et al. | |
|---|---|---|---|---|
| 5,940,769 A | * | 8/1999 | Nakajima et al. | 455/509 |
| 5,966,384 A | * | 10/1999 | Felix et al. | 370/465 |
| 6,049,902 A | * | 4/2000 | Davis et al. | 714/748 |
| 6,101,168 A | * | 8/2000 | Chen et al. | 370/228 |
| 6,104,709 A | * | 8/2000 | Rinchiuso et al. | 370/335 |
| 6,226,301 B1 | * | 5/2001 | Cheng et al. | 370/474 |

* cited by examiner

*Primary Examiner*—Frank Duong
(74) *Attorney, Agent, or Firm*—Kenneth A. Haas; Steven A. May

(57) ABSTRACT

Retransmissions of NAK'd frames takes place utilizing a retransmission channel (103–105). In particular, NAK'd frames are retransmitted to requesting remote units (113–115) on a channel (103–105) differing from the channel (109) in which they were originally broadcast to the remote units (113–115). Because retransmission of poorly-received frames occurs utilizing a channel that differs from the downlink multicast channel, the downlink transmission rate of the downlink channel is not reduced when retransmission needs to take place. This greatly improves data transmission to those units not requesting retransmission of data.

13 Claims, 3 Drawing Sheets

METHOD AND APPARATUS FOR DATA RETRANSMISSION WITHIN A COMMUNICATION SYSTEM

FIELD OF THE INVENTION

The present invention relates generally to communication systems and, in particular, to a method and apparatus for retransmitting data within a communication system.

BACKGROUND OF THE INVENTION

Next generation wireless communication system architecture must be able to provide an array of services comparable to wire-line services. One such service envisioned for the next generation Code Division Multiple Access (CDMA) architecture is multicasting. By definition, multicasting is a method which provides the delivery of information to multiple destinations without transmitting the same information content to each destination separately.

Typically, as more and more users are added to a multicast session, data rates tend to decrease. This is because retransmission of poorly received frames generally takes place over the same channel utilized for downlink data transmission. In other words, as more and more users request retransmission of poorly-received frames, valuable bandwidth is taken up during the retransmission of such frames, reducing the overall transmission rate of the downlink data channel. Therefore, a need exists for a method and apparatus for retransmission of data within a communication system that does not reduce downlink data rates.

BRIEF SUMMARY OF THE INVENTION

A method and apparatus provide for transmitting data to a first multiple remote units over a first channel. In response to receiving a request retransmit the data to a second multiple remote units, the data is retransmitted to the second multiple remote units over a second channel. By using a second channel different from the first channel for the retransmission, data may continue to be transmitted to the first multiple remote units concurrent with the retransmission without reducing downlink data rates.

DETAILED DESCRIPTION OF THE DRAWINGS

To address the above-mentioned need, retransmissions of frames takes place utilizing a retransmission channel. In particular, frames are retransmitted to requesting remote units on a channel differing from the channel in which they were originally broadcast to the remote units. Because retransmission of poorly-received frames occurs utilizing a channel that differs from the downlink multicast channel, the downlink transmission rate of the downlink channel is not reduced when retransmission needs to take place. This greatly improves data transmission to those units not requesting retransmission of data.

The present invention encompasses a method for retransmitting data within a communication system. The method comprises the steps of transmitting data to a first plurality of remote units over a first channel and receiving a request to retransmit the data to a second plurality of remote units. The data is retransmitted to the second plurality of remote units over a second channel while continuing to transmit data to the plurality of remote units over the first channel.

The present invention additionally encompasses a method comprising the steps of transmitting data to a first plurality of remote units over a supplemental channel and receiving a request from a second plurality of remote units to retransmit the data. The data is then retransmitted to the second plurality of remote units over a second channel differing from the supplemental channel.

The present invention additionally encompasses a method comprising the steps of receiving data transmitted on a first channel, requesting a retransmission of the data, and receiving retransmitted data on a second channel while continuing to receive data transmitted on the first channel, wherein the second channel differs from the first channel.

Figure 1:
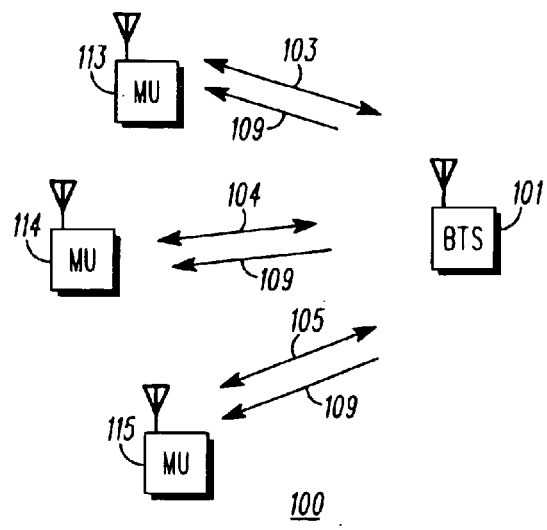
FIG. 1 is a block diagram of a communication system in accordance with the preferred embodiment of the present invention.

The present invention additionally encompasses an apparatus. The apparatus comprises first channel circuitry transmitting data to a first plurality of remote units over a first channel, logic circuitry coupled to the first channel circuitry, the logic circuitry having a request for retransmission as an input, and second channel circuitry retransmitting the data to a second plurality of remote units in response to the request. Turning now to the drawings, wherein like numerals designate like components, FIG. 1 is a block diagram of communication system 100 in accordance with the preferred embodiment of the present invention. In the preferred embodiment of the present invention, communication system 100 utilizes a next generation CDMA architecture as described in the cdma2000 International Telecommunication Union-Radio communication (ITU-R) Radio Transmission Technology (RTT) Candidate Submission document, but in alternate embodiments communication system 100 may utilize other analog or digital cellular communication system protocols such as, but not limited to, the next generation Global System for Mobile Communications (GSM) protocol, or the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008).

Communication system 100 includes at least one Base Transceiver Station (BTS) 101, and multiple mobile units (MUs) 113–115. Although not shown, communication system 100 additionally include well known network elements such as Mobile Switching Centers (MSCs), Centralized Base Station Controllers (CBSCs) in a circuit switch network, or such as Radio Network Controller (RNCs), Gatekeepers (GKs) and GateWays (GWs) in a packet switch network. It is contemplated that network elements within communication system 100 are configured in well known manners with processors, memories, instruction sets, and the like, which function in any suitable manner to perform the function set forth herein.

In the preferred embodiment of the present invention base station 101 is capable of providing a multicasting session to mobile, or remote units 113–115. More particularly, base station 101 utilizes the Internet Group Management Protocol (IGMP) as described in Request for Comments (RFC) document 1112 and RFC 2236 of the Internet Engineering Task Force (IETF) to provide multicasting. Remote units 113–115 that wish to receive a multicast session, monitor a multicast advertisement message on a system broadcast channel to determine a session to receive. Broadcast channels are part of the common forward physical/paging channel as described in Mobile Station-Base Station Compatibility Standards for Dual-Mode Wideband Spread Spectrum Cellular Systems, Telecommunications Industry Association Interim Standard 95A, Washington, D.C. July 1993 (IS-95A).

In the preferred embodiment of the present invention, advertisement messages include information about multicast events available to remote units 113–115. The information includes the session's Internet Protocol (IP) address, port number, time and duration of the transmission, and a brief description of the event. In the preferred embodiment of the present invention, the supplemental channel request/granted/control messages for the CDMA air interface is carried as a payload in the TIA/EIA/95 Data Burst messages. An Extended Burst Type Assignment of 0x8001, as defined in TLA/EIA/TSB58-B Table4.2-1, is used to indicate that Data Burst carries a dispatch control messages.

Base station 101 forwards the multicast session over the air interface via a high-speed data channel (supplemental channel 109). Once a remote unit requests participation in the multicast event, common supplemental channel 109 is assigned to the remote unit, and the multicast session is broadcast to all remote units currently participating in the multicast event.

As discussed above, a problem arises when remote units 113–115 request retransmission of poorly-received multicast frames. In order to address this problem, in the preferred embodiment of the present invention a single channel is provided for retransmission purposes, however, in an alternate embodiment of the present invention each remote unit 113–115 is provided its own retransmission channel 103–105. During retransmission of data, all retransmission occurs utilizing the additional retransmission channel(s).

Because retransmission of poorly-received frames occurs utilizing a channel that differs from the downlink multicast channel, the downlink transmission rate of the supplemental channel is not reduced when retransmission needs to take place. This greatly improves data transmission to those units 113–115 not requesting retransmission of data.

Figure 2:
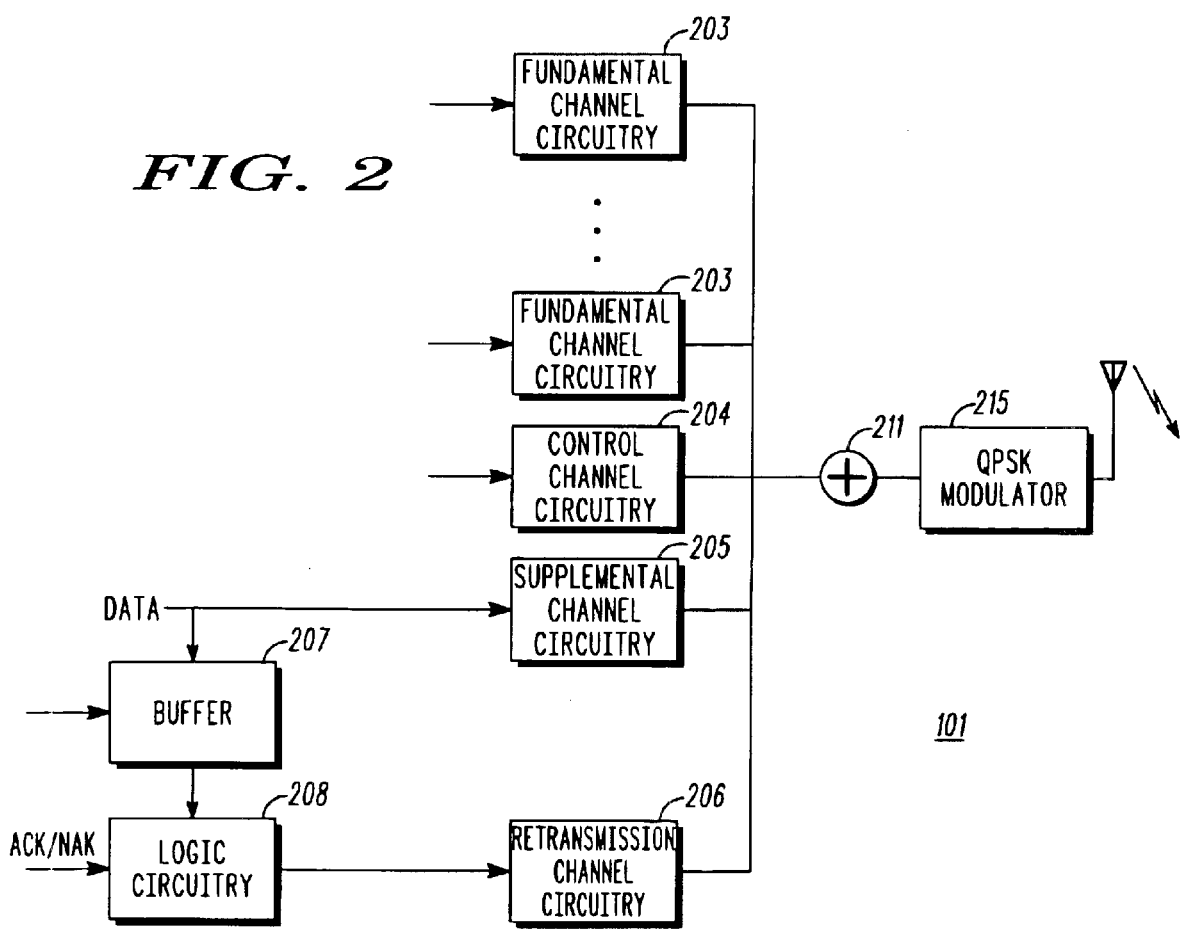
FIG. 2 is a block diagram of the base station of FIG. 1 in accordance with the preferred embodiment of the present invention.

FIG. 2 is a block diagram of base station 101 of FIG. 1 in accordance with the preferred embodiment of the present invention. Base station 101 comprises logic circuitry 208, over-the-air transmission circuitry comprising one or more common control channel circuits 204, one or more fundamental channel circuits 203, one or more supplemental (or high-speed data) channel circuits 205, one or more retransmission channel circuits 206, summer 211, and modulator 215. In the preferred embodiment of the present invention, base station 101 utilizes two classes of channels defined for both forward and reverse transmission. In the preferred embodiment, fundamental channels 203 are similar to existing CDMA traffic channels used for voice and signaling. Similarly, common control channel 204 is used for passing system information and control signaling, along with multicast advertisement information.

When transmitting a multicast session (or group call), fundamental channels 203 or common control channels 204 (i.e., low data-rate channels) are utilized to transmit Internet Group Management Protocol (IGMP) messages for subscribing and de-subscribing to a multicast session. Fundamental channels 203 are also utilized to receive and transmit voice data to remote units 113–115 involved in the group call. CDMA traffic and common control channels are described in detail in IS-95A as well as the RTT Candidate Submission Document. Additionally, soft handoff (simultaneous communication utilizing more than one fundamental channel circuit 203) is supported utilizing fundamental channel circuitry 203.

Supplemental channel circuitry 205 is utilized for communicating high data rate services (e.g., multicast packet data, video, . . . , etc.) to remote units 113–115. The data rate of the supplemental channels is specified prior to transmission. Multiple data sources are time multiplexed on this channel. In addition, the Quality-of-Service (e.g., Frame Error Rate (FER), Bit Error Rate (BER) and/or Transmission Delay) of this channel may be set and operated independently of the fundamental channel.

As discussed above, in the preferred embodiment of the present invention a single retransmission channel 206 is utilized to retransmit data as it is requested by remote units 113–115. Although retransmission channel circuitry is shown differing from fundamental, control, and supplemental channel circuitry, one of ordinary skill in the art will recognize that any currently existing channel (including the fundamental, control, and supplemental channels) may be utilized for the purposes of retransmitting data as described herein.

Data transmission and retransmission from base station 101 in accordance with the preferred embodiment of the present invention occurs as follows: During the multicast session, each remote unit 113–115 receives downlink supplemental transmission 109 that contains high-speed data. In current Code Division Multiple Access (CDMA) communication systems, a Radio Link Protocol (RLP) is utilized for the link layer to transport data traffic between a mobile unit and infrastructure equipment. RLP is a Negative-Acknowledgment (NAK) based protocol in that the receiver does not acknowledge correctly-received RLP frames. In-order delivery is accomplished with the use of a sequence number (SEQ) on each frame. RLP maintains a counter for the sequence number of the next new data frame to send [SEQ(S)] and a counter for the sequence number of the next new data frame it expects to receive [SEQ(R)]. RLP requests the retransmission of RLP frames when a frame is received with a sequence number greater than the next expected sequence number (SEQ(R)). Retransmission of a particular frame is accomplished by sending a NAK to base station 101 identifying the sequence number of the frame not received.

In the preferred embodiment of the present invention logic circuitry 208 receives a NAK, or multiple NAKs for the particular frame, transmitted by multiple remote units. Instead of retransmitting the NAK'd frame over supplemental channel circuitry 205, a retransmission channel is utilized for downlink retransmission of data. As discussed above, in the preferred embodiment of the present invention a single downlink retransmission channel is utilized per multicast session, however, in alternate embodiments of the present invention, multiple downlink channels may be utilized for retransmission purposes.

During retransmission, logic circuitry 208 determines a power level for retransmission of all lost packets. In particular, each remote unit is engaged in its own separate power control loop with the infrastructure. For example, in the case of a remote unit using a fundamental channel (DCCH), the power control loop on the fundamental channel creates an estimate of the power required to communicate with that remote unit in the forward and reverse direction. If the supplemental channel is sending only to that remote unit, then this gain that then needs to be used on the SCH is a scaled version of the gain in use on the fundamental channel. This is because the supplemental channel generally sees the same level of interference as does the fundamental channel.

Because retransmission of poorly-received frames occurs utilizing a channel that differs from the downlink multicast channel, the downlink transmission rate of the supplemental channel is not reduced when retransmission needs to take place. This greatly improves data transmission to those units 113–115 not requesting retransmission of data.

Figure 3:
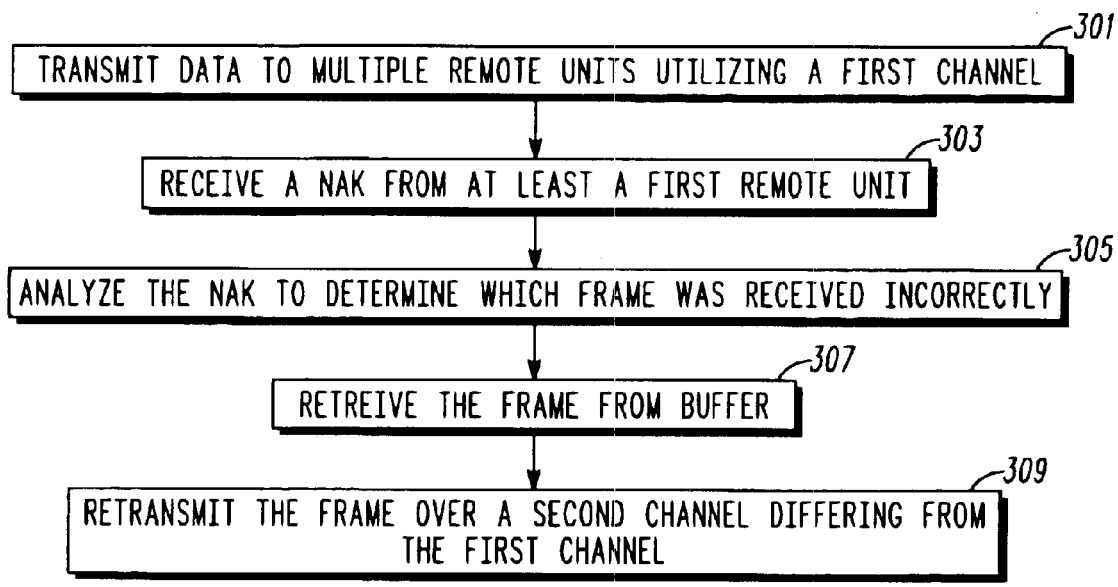
FIG. 3 is a flow chart showing operation of the base stations of FIG. 1 and FIG. 2 in accordance with the preferred embodiment of the present invention.

FIG. 3 is a flow chart showing operation of base station 101 in accordance with the preferred embodiment of the present invention. The logic flow begins at step 301 where base station 101 is actively transmitting data to a first plurality of remote units utilizing a first channel. As discussed above, the first channel is preferably a supplemental data channel, however, in alternate embodiments of the present invention the first channel may be any defined channel. At step 303 base station 101 receives NAKs from a subset of the first plurality of remote units. Base station 101 analyzes the NAKs to determine which frame was received incorrectly (step 305), retrieves the frame from buffer 207 (step 307) and retransmits the frame over a second channel differing from the first channel (step 309). It should be noted that at step 309 the frame is retransmitted to all remote units that requested retransmission while data continues to be transmitted over the first channel. Additionally, as discussed above, although retransmission channel circuitry is shown differing from fundamental, control, and supplemental channel circuitry, one of ordinary skill in the art will recognize that any currently existing channel (including a second supplemental channel) may be utilized for the purposes of retransmitting the frame. Finally, the frame is retransmitted having a power level equal to the maximum of the gain required by the mobiles which sent a NAK for that frame, as implied by the power control loops for those mobiles which sent a NAK for that frame.

Figure 4:
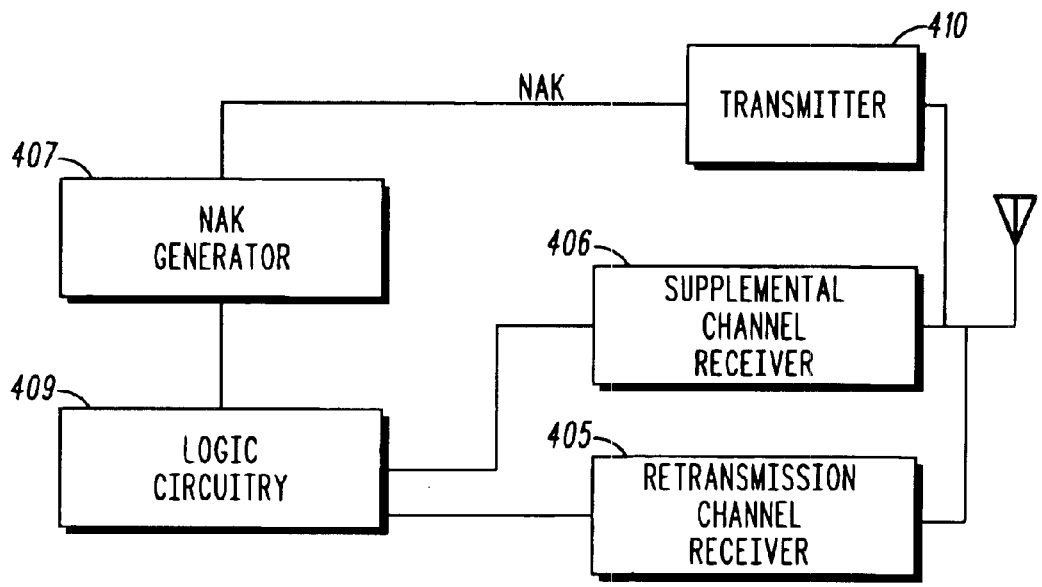
FIG. 4 is a block diagram of a remote unit in accordance with the preferred embodiment of the present invention.

FIG. 4 is a block diagram of a remote unit in accordance with the preferred embodiment of the present invention. As shown, the remote unit comprises supplemental channel receiver 406 for receiving downlink supplemental channel transmissions, and retransmission channel receiver 405 for receiving retransmissions of poorly received downlink frames. In the preferred embodiment of the present invention the remote unit utilizes RLP. As discussed above, RLP is a Negative-Acknowledgment based protocol in that the receiver does not acknowledge correctly-received RLP frames. The remote unit only requests the retransmission of missing RLP frames by sending a NAK to base station 101. In particular, when a frame is received out of sequence, logic circuitry 409 will instruct NAK generator 407 to NAK the improperly received (or un-received) frame. The NAK will be transmitted via transmitter 410 and will be eventually received by base station 101. Base station 101 will retransmit the improperly-received frame, however, unlike prior-art communication systems, base station 101 will transmit the improperly received frame over a channel differing from the channel in which the frame was originally transmitted.

Figure 5:
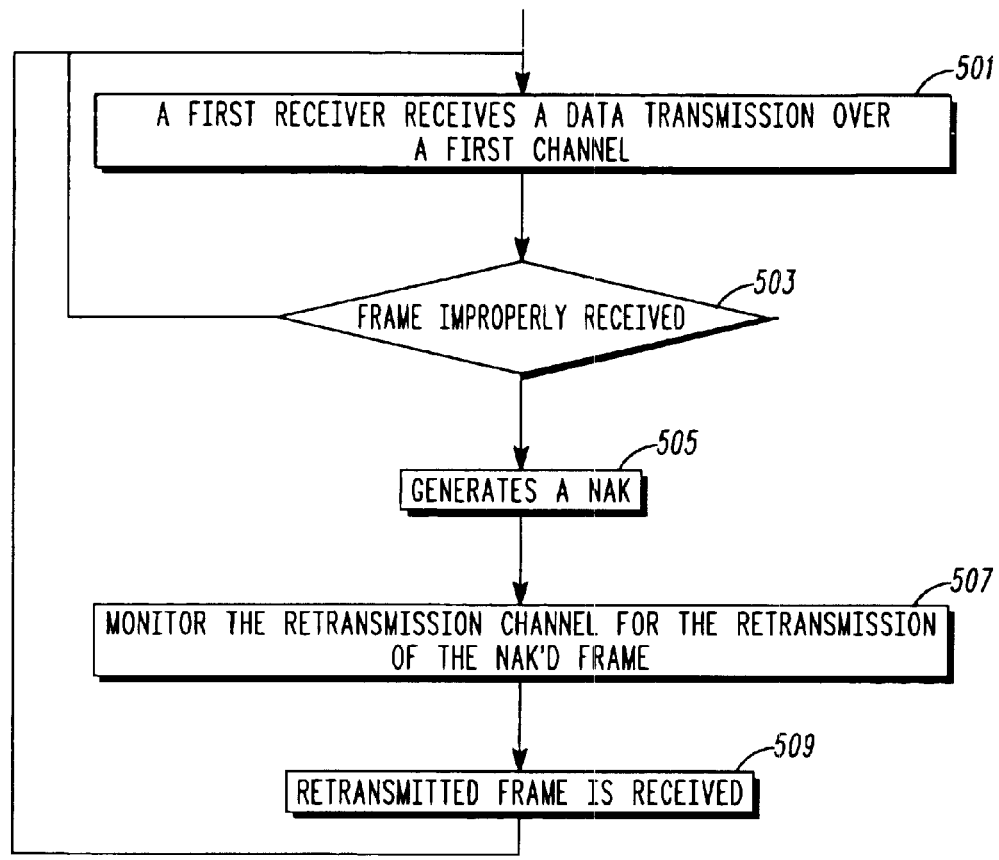
FIG. 5 is a flow chart showing operation of the remote unit of FIG. 4 in accordance with the preferred embodiment of the present invention.

FIG. 5 is a flow chart showing operation of the remote unit of FIG. 4 in accordance with the preferred embodiment of the present invention. The logic flow begins at step 501 where a first receiver receives a data transmission over a first channel. As discussed above, in the preferred embodiment of the present invention the first channel comprises a supplemental channel, however, in alternate embodiments of the present invention, other channels may be utilized. During reception, logic circuitry 409 determines if a frame has been improperly received (step 503) and if so NAK generator 407 generates a NAK (step 505). If, at step 503 it has been determined that the frame has been properly received, the logic flow simply returns to step 501.

Continuing, at step 507 logic unit instructs retransmission channel receiver 405 to monitor the retransmission channel for the retransmission of the NAK'd frame. At step 509 the retransmitted frame is received via retransmission channel receiver 405. The logic flow then returns to step 501 where continued reception of the data continues over the first channel.

Because retransmission of poorly-received frames occurs utilizing a channel that differs from the downlink multicast channel, the downlink transmission rate of the supplemental channel is not reduced when retransmission needs to take place. This greatly improves data transmission to those units 113–115 not requesting retransmission of data.

Figure 6:
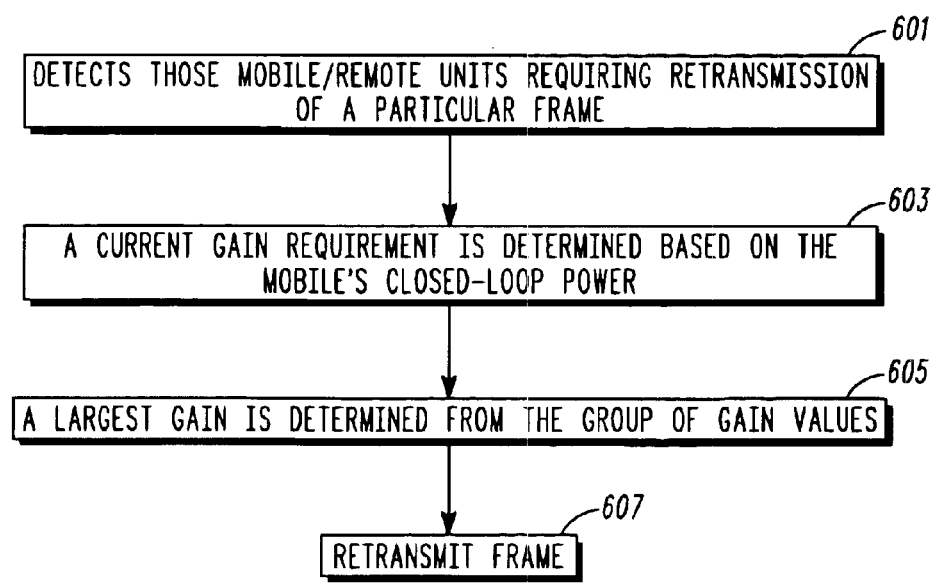
FIG. 6 is a flow chart showing the steps necessary for determining a proper retransmission power level in accordance with the preferred embodiment of the present invention.

FIG. 6 is a flow chart showing the steps necessary for determining a proper retransmission power level in accordance with the preferred embodiment of the present invention. The logic flow begins at step 601 where logic circuitry 208 detects those mobile/remote units requiring retransmission of a particular frame. For each of these mobiles, a current gain requirement is determined based on the mobile's closed-loop power (step 603). A largest gain is determined from the group of gain values(step 605). The frame is then retransmitted as described above, having a gain value equal to the largest value out of the group of gain values (step 607).

While the invention has been particularly shown and described with reference to a particular embodiment, it will be understood by those skilled in the art that various changes in form and details may be made therein without departing from the spirit and scope of the invention. It is intended that such changes come within the scope of the following claims.

What is claimed is:

1. A method for retransmitting data within a communication system, the method comprising the steps of:

transmitting data to a first plurality of remote units over a first channel;

receiving a request to retransmit the data to a second plurality of remote units, wherein the second plurality of remote units comprises a subset of the first plurality of remote units;

determining a power level for a retransmission of the data by
      determining gain requirements for each remote unit within the second plurality of remote units;
      determining a largest gain from the gain requirements; and retransmitting the data to the second plurality of remote units over a second channel at a power level equal to the largest gain while continuing to transmit data to the first plurality of remote units over the first channel.

2. The method of claim 1 wherein the step of transmitting data comprises the step of transmitting data to a plurality of remote units over an over-the-air channel.

3. The method of claim 2 wherein the step of transmitting data over the first channel comprises the step of transmitting data via a high-speed over-the-air data channel.

4. The method of claim 3 wherein the step of transmitting data comprises the step of transmitting the data over a supplemental channel.

5. The method of claim 1 wherein the step of receiving the request to retransmit the data comprises the step of receiving a Negative Acknowledgment (NAK) from at least one remote unit identifying data that needs to be retransmitted.

6. The method of claim 1 wherein the step of retransmitting the data comprises the step of retransmitting the data over an over-the-air channel.

7. The method of claim 6 wherein the step of retransmitting the data comprises the step or retransmitting the data over a channel selected from the group consisting of a fundamental channel, a control channel, and a supplemental channel.

8. An apparatus comprising:

first channel circuitry transmitting data to a first plurality of remote units over a first channel;

logic circuitry coupled to the first channel circuitry, the logic circuitry having a request for retransmission as an input and wherein the logic circuitry determines gain requirements for each remote unit within a second plurality of remote units and determines a largest gain from the gain requirements, wherein the second plurality of remote units comprises a subset of the first plurality of remote units; and second channel circuitry retransmitting the data to the second plurality of remote units over a second channel in response to the request, wherein the second channel circuitry retransmits the data to the second plurality of remote units at a power level equal to the largest gain.

9. The apparatus of claim 8 wherein the first channel circuitry and the second channel circuitry are over-the-air channel circuitry.

10. The apparatus of claim 8 wherein the request for retransmission comprises a negative acknowledgment (NAK) transmitting received from the second plurality of remote units.

11. A method comprising the steps of:

transmitting data to a first plurality of remote units over a first channel;

receiving a request from a second plurality of remote units to retransmit the data, wherein the second plurality of remote units comprises a subset of the first plurality of remote units;

determining gain requirements for each remote unit within the second plurality of remote units;

determining a largest gain from the gain requirements; and retransmitting the data to the second plurality of remote units over a second channel differing from the first channel and at a power level equal to the largest gain.

12. The method of claim 11 wherein the step of receiving the request to retransmit the data comprises the step of receiving a Negative Acknowledgment (NAK) from the second plurality of remote units identifying data that needs to be transmitted.

13. The method of claim 11, wherein the first channel is a supplemental channel.

* * * * *